No. 650,588. Patented May 29, 1900.
T. O. PERRY.
TEMPERATURE REGULATOR AND GAS VALVE.
(Application filed July 29, 1896.)
(No Model.) 3 Sheets—Sheet 1.
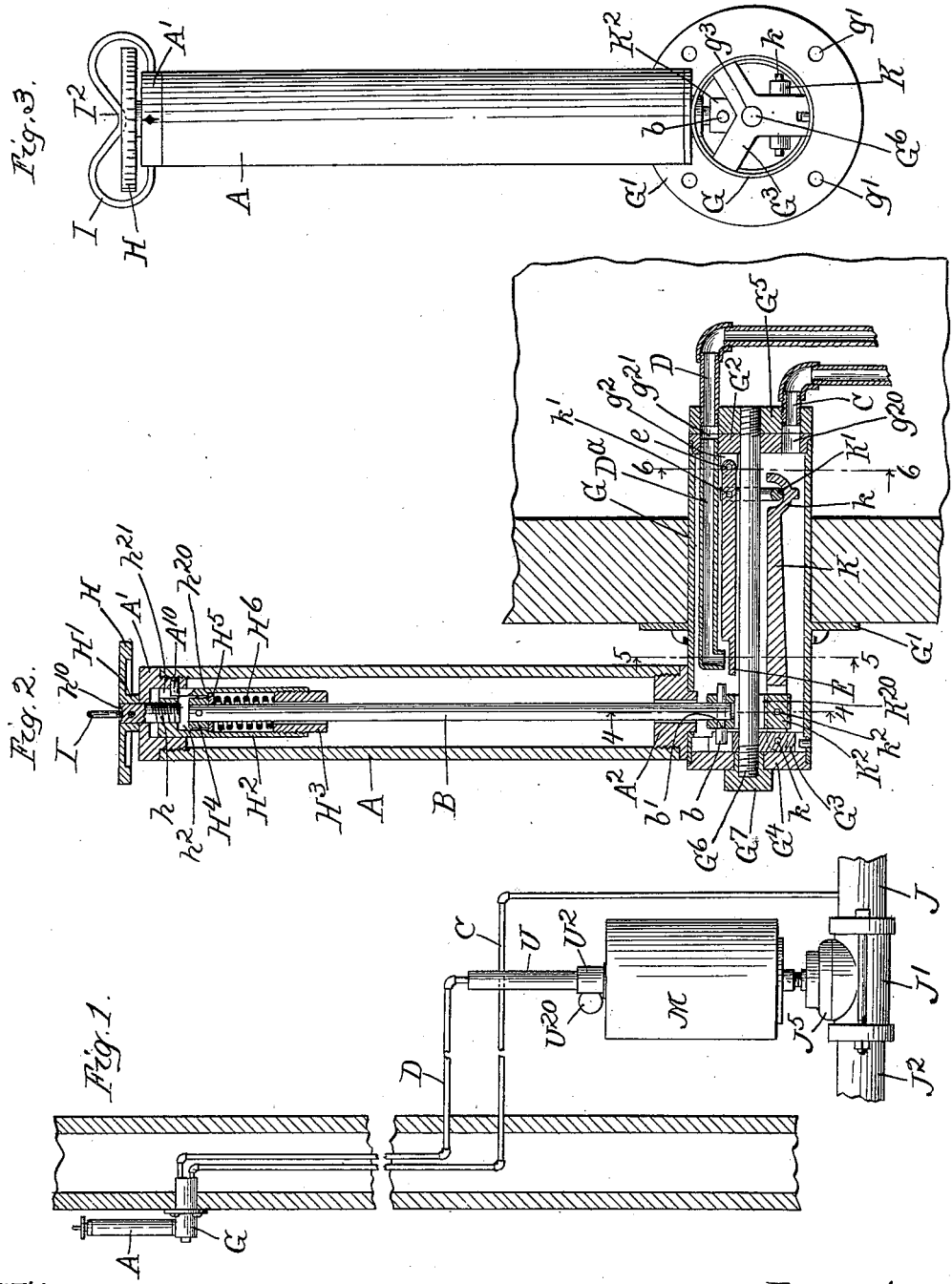
Witnesses.
E. T. Wray.
Jean Elliott.
Inventor,
Thos. O. Perry
by Burton and Burton
his attys.
THE NORRIS PETERS CO., PHOTO-LITHO., WASHINGTON, D. C.

No. 650,588. Patented May 29, 1900.
T. O. PERRY.
TEMPERATURE REGULATOR AND GAS VALVE.
(Application filed July 29, 1896.)
(No Model.) 3 Sheets—Sheet 2.
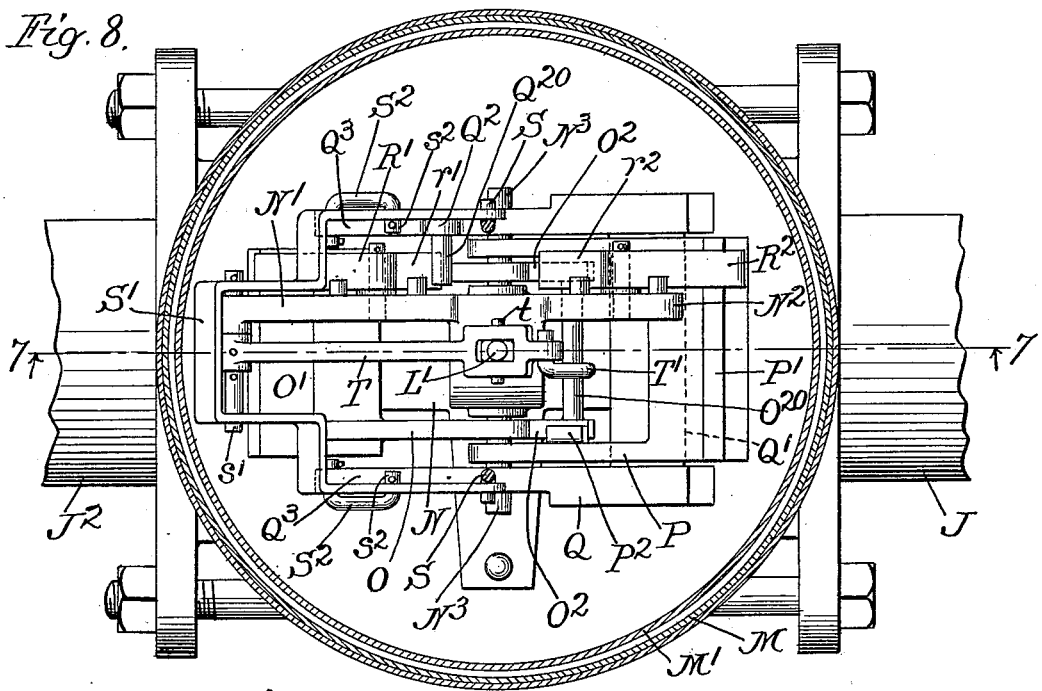
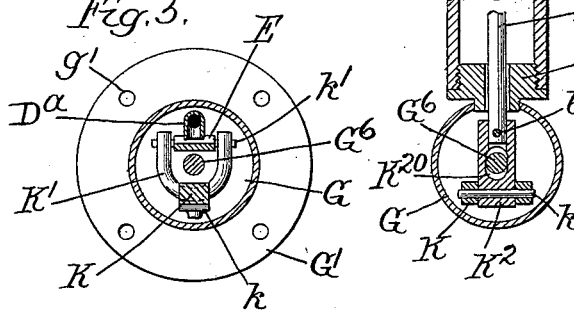
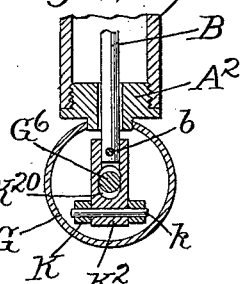
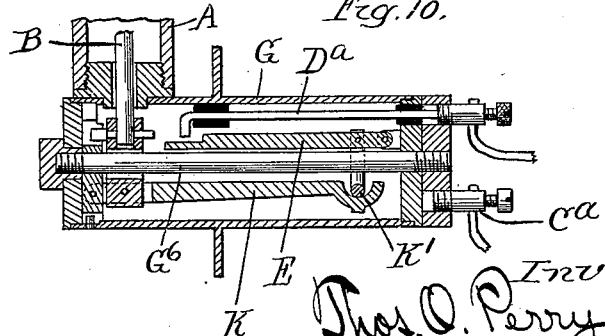
Witnesses.
E. T. Wray
Jean Elliott
Inventor,
Thos. O. Perry
by Burton and Burton
his attys
THE NORRIS PETERS CO., PHOTO-LITHO., WASHINGTON, D. C.

No. 650,588. Patented May 29, 1900.
T. O. PERRY.
TEMPERATURE REGULATOR AND GAS VALVE.
(Application filed July 29, 1896.)
(No Model.) 3 Sheets—Sheet 3.
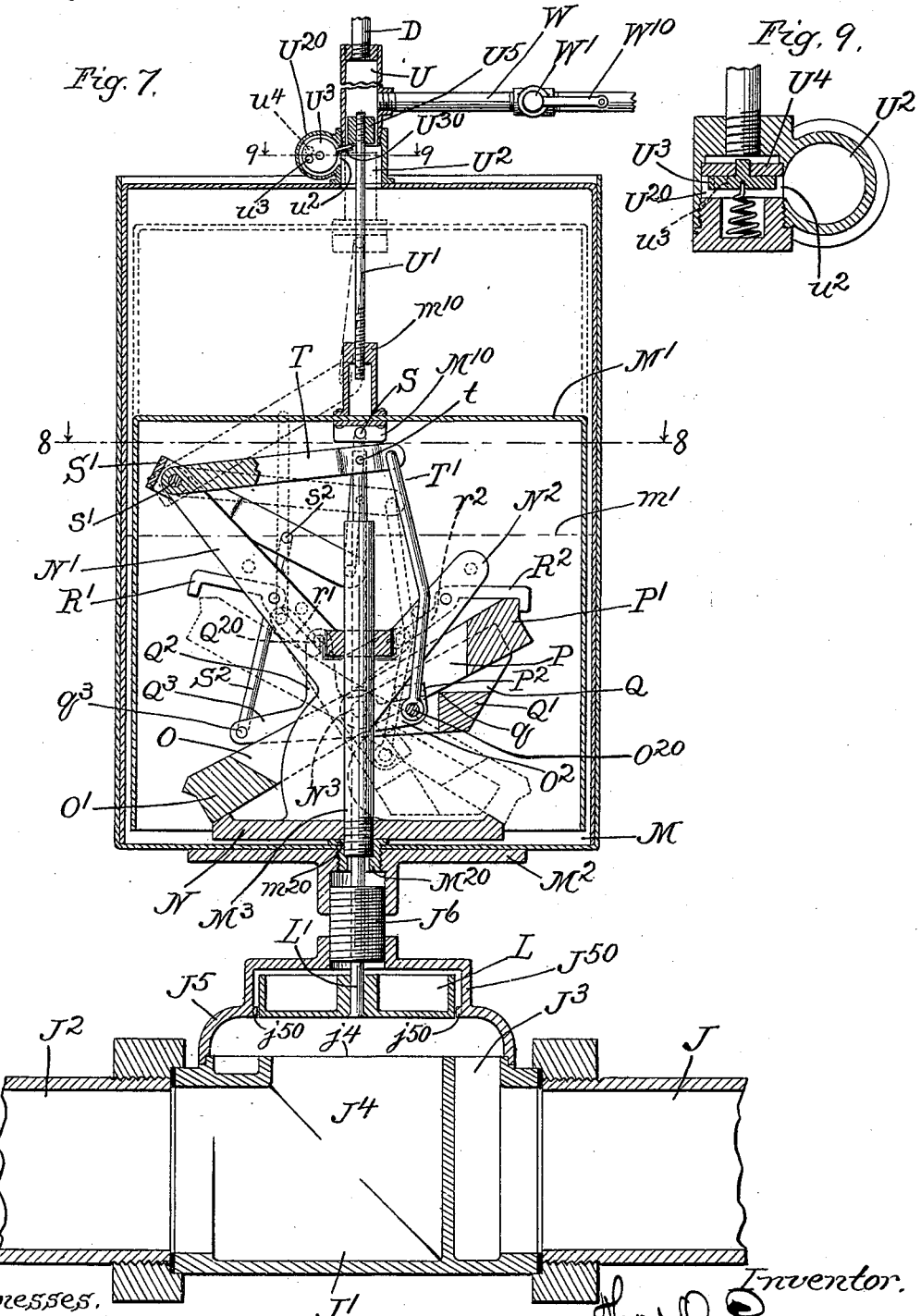
Witnesses. Inventor.

UNITED STATES PATENT OFFICE.

THOMAS O. PERRY, OF CHICAGO, ILLINOIS.

TEMPERATURE-REGULATOR AND GAS-VALVE.

SPECIFICATION forming part of Letters Patent No. 650,588, dated May 29, 1900.

Application filed July 29, 1896. Serial No. 600,873. (No model.)

*To all whom it may concern:*

Be it known that I, THOMAS O. PERRY, a citizen of the United States, residing at Chicago, county of Cook, and State of Illinois, have invented certain new and useful Improvements in Temperature-Regulators and Gas-Valves, which are fully set forth in the following specification, reference being had to the accompanying drawings, forming a part thereof.

The purpose of this invention is to provide an improved thermostatic device for automatically regulating the temperature of apartments, especially those artificially heated, in which case the regulating is effected by regulating the heat-supply or heat generation.

In certain respects this invention is especially designed for the regulation of heat generated by fuel-gas.

In the drawings, Figure 1 is a condensed diagram showing in exterior elevation my improved thermostat and main valve which controls the supply of fuel-gas for heating. Fig. 2 is a vertical section of my improved thermostat, showing it in operative position mounted on the wall of the apartment. Fig. 3 is a detail elevation of the forward end of the horizontal barrel of the thermostat with the end cap removed. Fig. 4 is a section at the line 4 4 on Fig. 2. Fig. 5 is a section at the line 5 5 on Fig. 2. Fig. 6 is a section at the line 6 6 on Fig. 2. Fig. 7 is a vertical section at the plane indicated by the line 7 7 on Fig. 8, through my improved gas-valve and operating devices adapted to be controlled by the thermostat. Fig. 8 is a section at the line 8 8 on Fig. 7. Fig. 9 is a detail section of the upper end portion of the valve-operating devices, showing a modification in respect to the devices for venting or permitting the escape of the pressure fluid by which the valve is governed under the action of the thermostat. Fig. 10 is a detail section of a horizontal portion of the thermostat-chamber, showing a modification adapting the device for use in connection with an electrically-operated main valve.

I will first describe my improved thermostat, premising that it is of the class adapted to regulate a main valve which controls the heat or fuel supply by means commonly described as "pneumatic," because the agent for communicating the action of the thermostat to the valve has usually been compressed or rarefied air, or, generally speaking, a fluid under tension. This thermostat is adapted to operate with compressed air or any other fluid under tension, and in so far as its construction alone is concerned it is immaterial whether the fluid employed be air or any other gas. The expanding and contracting element in this thermostat is a hard-rubber tube A. More strictly speaking, the action is produced by difference in contraction and expansion of the hard-rubber tube A and the metal operating-rod B, which extends longitudinally within the hard-rubber tube and with it constitutes what is known as a "differential couple;" but the coefficient of expansion and contraction being much higher than that of the metal, and the metal rod being, moreover, protected to a very large extent from the influence of the temperature which is to be controlled and which is experienced directly on all sides by the hard-rubber tube, the contraction and expansion of the rod may be ignored in the expansion of the device, though of course it enters into account in its adjustment.

A primary purpose of my invention is to avoid or diminish to the minimum the friction or other resistance necessary to be overcome in operating the valve or valves which control the ducts through which the load under tension is admitted or wasted, and in order to make it unnecessary to employ stuffing-boxes or other close guide-bearings for the valve-stems, which are operated by their connection with the expanding and contracting element, I make said expanding and contracting element to consist or form part of a closed chamber into which the said ducts lead and into which they open and within which therefore may be located the necessary valve or valves to control said ducts and all the mechanism required to operate such valve or valves by the expansion and contraction of the chamber-walls which inclose them. The expanding and contracting element and the entire chamber which it constitutes or of which it may form a part thereby become a part of the conduit for the compressed air or other gas, the valves therefore requiring no stems penetrating the walls. I am thus able to operate the valves with the minimum resistance from friction.

As a matter of convenience in mounting the thermostat on the wall and leading the ducts to it I make the chamber G, which contains a portion of the mechanism and valve and into which the ducts lead, as a horizontal extension from one end of the expanding and contracting tube A. This horizontal portion is thus adapted to be inserted through the wall into the space between the studding, so that the ducts C and D may enter it at that end, while the tube A is fully exposed on all sides to the atmosphere of the apartment, while at the same time all the operating devices are completely inclosed and screened within it and the extension G from its lower end. With this construction I am able to make a highly-ornamental device without adding any feature whatever for the purpose of ornament merely.

C is a duct which leads from the source of compressed air or other gas under tension for the purpose of operating the device.

D is the duct which leads back to the valve-controlling mechanism for operating it, as required, by changes of temperature.

Either of the duct C or D may be controlled by a valve within the chamber G. I have shown the duct D so controlled by the valve E. Any suitable connection of links and levers may be made from the rod B to the valve to cause the expansion and contraction of the tube A, to which the rod B is connected at one end to operate the valve, and in the broadest view of this part of my invention I do not limit myself to any particular mechanism for this purpose, though specifically I prefer and claim the mechanism shown and which I will now describe.

A' is a plug adapted to be screwed into the upper end of the tube A. It has, however, a central aperture which admits the threaded stem $h$ of the screw, which has a graduated head H. The hub H' of the screw-head H seats accurately upon the upper surface of the cap A, so that it closes gas-tight the aperture through the plug when said screw-head is properly held down to the seat thus made. The rod B is coupled to the screw H $h$ by means of a spring-coupling, which comprises a sleeve $H^2$, into which the stem $h$ is screwed, a collar $H^3$, screwed into the lower end of the sleeve $H^2$, a stop-collar $H^4$, pinned onto the upper end of the rod B and adapted to enter a reduced portion $h^2$ of the cavity of the sleeve $H^2$ just below the head of the sleeve into which the stem $h$ is screwed, a washer $H^5$, which is stopped against the lower end of the stop-collar $H^4$, but is of too great diameter to enter the cavity $h^2$ and is therefore stopped against the shoulder $h^{20}$ at the lower end of said reduced cavity, and, lastly, a spring $H^6$, coiled about the rod B and reacting against the washer $H^5$ at the upper end and against the upper end of the collar $H^3$ at the lower end. Consideration of this structure will make it apparent that it constitutes an elastic coupling to connect the rod B within the screw H $h$. The screw H $h$ is designed to afford means for adjusting the rod B by drawing it up or letting it down to adapt it to seat the valve E at predetermined temperature. In order that the rotation of the graduated head H for this purpose shall not rotate the rod or the sleeve $H^2$, with which the immediate connection of the screw is made, a groove and feather are provided in the sleeve $H^2$ and the plug A', respectively, to restrain such rotation. The groove is indicated by the letter $h^{21}$, and the feather is in the form of a pin $A^{10}$, which is inserted through the threaded portion of the plug and sunk below the bottom of the thread, so that it does not interfere therewith, but, on the contrary, is itself retained in place by the engaging thread of the tube A after the plug is screwed into place.

All the parts thus far described, constituting the coupling of the rod B to the screw-head H, are assembled, as described, including the pin $A^{10}$, before the rod is inserted down in the tube A, and the rod being then inserted from the upper end and its lower end entered through the plug $A^2$, which is screwed into the lower end of the tube A, is in construction to be considered as part of the horizontal extension-chamber G. This extension-chamber G is preferably a metal tube with a flange G', adapted to stop against the outer surface of the wall into which the rear portion of the tube is inserted and to afford means for securing the device in place upon the walls by means of screws set through the holes $g'$. The mechanism contained in this tube consists of a lever K, having a fixed fulcrum at $k$, the valve E, already mentioned, which has a fixed fulcrum at $e$, a link K', pivoted to the valve at $k'$ and resting in the stirrup $k$ of the lever K, and a link $K^2$, pivoted to the lever K at $k^2$ and connected to the lower end of the rod B by the pin $b$. The operation of this mechanism will be seen to be that the expansion of the tube A, being equivalent to the relative shortening of the rod B, causes said rod to pull upward from the link $K^2$, lifting the lever K, pushing up by means of the link K' upon the valve-lever E, and seating the valve against the downwardly-turned mouth of the duct D, and that the contraction of the tube K by the reversion of the movements above described tends to unseat the valve.

For convenience of assembling the parts described within the chamber extension G they are constructed in detail, as described, and adapted to be assembled, as follows: First, before the tube A, with its assembled parts, is screwed onto the plug $A^2$ the plug $G^2$, having the lug $g^2$, has pivoted to it at its lug the valve E, to which the link K' is connected at $k'$, and the inner portion $D^a$ of the duct D is connected to the plug in position to permit the valve to seat properly over the downturned mouth of said duct. With these parts connected, as described, to the plug $G^2$, it is driven tight into the rear end of the chamber G. Into the other end of the chamber the three-armed spider $G^3$, having pivoted to it at $k$ the lever K, said lever having pivoted to it at $k^2$ the link $K^2$, is inserted, the tube being for that purpose inclined in such position as to cause the link K to hang toward the forward end of the chamber G alongside of the valve E, so that the end of the valve K having the stirrup $k$ may pass the link far enough to permit the latter to drop into the stirrup when the chamber is brought into horizontal position, and this being done and the link and lever being thus engaged the insertion of the spider and lever is continued, and the spider is forced tight into the forward end of the chamber, care being taken that the pivot of the lever K stands horizontally across the chamber G, which brings the upper end of the link $K^2$ with the duct which is adapted to receive the lower end of the rod B in vertical position underneath the central opening of the plug $A^2$. The tube A being now applied, the rod B being properly entered through the plug $A^2$, and the tube being screwed down onto said plug, the parts may readily be adjusted so that the pin-holes through the link $K^2$ and the lower end of the rod B, intended to receive the pivot-pin $b$, register properly, whereupon said pin may be inserted properly through the forward end of the tube G, between the two upper ends of the spider $G^3$, the pin having a shoulder $b'$, which stops against the link and prevents the pin from getting out of place by going on through into the chamber. The two heads $G^4$ and $G^5$, connected by the rod $G^6$, remain to be put into place. The head $G^5$ has the ducts C and D, which are adapted to register with the corresponding apertures $g^{20}$ and $g^{21}$, with which the plug $G^2$ is provided, (the latter aperture being the one at which the portion $D^a$ of the duct D is connected to said plug,) and the head $G^4$ is adapted to be driven tight into the forward end of the tube G in front of the spider $G^3$. The rod $G^6$ is screwed into the head $G^5$ and then inserted through the central apertures in the plugs $G^2$ and $G^3$, through the loop of the link $K'$, and the central aperture $K^{20}$ of the link $K^2$ and central aperture $g^3$ of the spider $G^3$, the head $G^4$ having been properly forced into place, preventing the escape of the pin $b$, and the binding-nut $G^7$ is screwed onto the forward end of the stem $G^6$ and tightened until the two heads are bound firmly onto the chamber, retaining all the parts in proper place. In order to hold the graduated screw H down upon the top of the plug $A'$ to make the aperture at that point gas-tight, I provide the bail-spring I, whose ends are engaged after the manner of a bail in the periphery of a plug $A'$ and which has the central knee-bend $I^2$, which bears in the central socket or seat $h^{10}$, provided for it upon the top of the screw-head H. The device is now ready to be mounted upon the wall and secured by screws through the holes $g'$.

I will now describe the valve which I employ when this thermostat is to be used to regulate fuel-gas. J is the gas-supply pipe leading to the valve $J'$, from which the pipe $J^2$ leads to the burner. It will be understood from the drawings that this valve has an annular gas-inlet port $J^3$, from which the gas passes over into the cylindrical cavity $J^4$ and out thence to the pipe $J^2$. The upper margin $j^4$ of the wall of the cylindrical cavity $J^4$ constitutes the valve-seat, the valve L being cylindrical and adapted to reciprocate toward and from said annular seat $j^4$ in a cylindrical extension $J^{50}$, formed in the cap $J^5$ of the valve-body. The valve L, however, does not reciprocate pistonwise in this extension $J^{50}$, but is guided therein by the marginal guide-lugs $j^{50}$, so that there is at all times a free passage for gas around the valve L from the annular port $J^3$ to the nipple or pipe $J^6$, which leads upward from the center of the cylindrical extension $J^{50}$ of the cap $J^5$. The stem $L'$ of the valve L extends up through the nipple or pipe $J^6$, which connects the valve with the chamber which contains the valve-operating mechanism. This chamber M is a gas-tight cylinder, which is conveniently made of sheet metal in two telescoping parts, as illustrated, the crevice between them being water-sealed and requiring, therefore, no more secure connection than to be telescoped together, as shown, making it easy to dissect the device for the purpose of investigating or adjusting the mechanism. In this chamber is a bell-receiver or inverted cup $M'$, and the chamber is designed to be filled with water or other liquid to some suitable point, (indicated by the dotted line $m'$.) A flange $M^2$, secured to the bottom of the chamber M, having suitable apertures corresponding with a central aperture in said bottom, serves as a means for connecting the chamber to the nipple $J^6$. The flange is conveniently secured to the bottom of the chamber M by means of a flanged collar or bushing $M^{20}$, which is screwed down from within the chamber into the central aperture of the flange $M^2$, the flange $m^{20}$ of said bushing binding the bottom of the chamber M tightly onto the top of the flange $M^2$. Into the central opening of the flange $M^2$—that is to say, into the bushing $M^{20}$ when such bushing is employed for the purpose described— the pipe $M^3$ is screwed, constituting a continuation of the gas-passage from the nipple $J^6$ up into the chamber M, said pipe $M^3$ terminating open at its upper end above the waterline $m'$ under the bell $M'$. The valve-stem $L'$ extends up through the pipe $M^3$, leaving ample space within the pipe around said stem for the passage of gas, and terminates above said pipe, but still within the bell $M'$. Upon the bottom of the chamber M there is mounted a standard N, penetrated at the center by the pipe $M^3$ and having two arms $N'$ and $N^2$, which afford fulcrums for levers concerned in the operation of the mechanism. On the standard N at the trunnions $N^3 N^3$ are pivoted three levers—first, the lever O, weighted as seen at O'; second, the lever P, weighted as seen at P', and, third, the lever Q, weighted as seen at Q'. The lever O has a finger $O^2$ projecting beyond the fulcrum alongside of the arm of the lever P, and the latter has an abutment $P^2$, under which said finger $O^2$ engages when the two levers are extended in substantially-opposite directions from the fulcrum. Normally it will be seen that the two levers tend to stand thus extended, with the stop $P^2$ extending upon the finger $O^2$, and if the weighted ends of both are lifted so that the levers stand at an angle to each other about their pivot each is free to fall until stopped by the contact of said finger. The lever P is so heavily weighted that when the two levers are thus engaged by the contact of the abutment and finger the weighted end of the lever P will descend and the weighted end of the lever O will rise, and the two levers will occupy the position shown in dotted line in Fig. 7 in the absence of prevention from other parts. The lever Q extends across under the arms of the lever P, which latter lever tends, therefore, to rest upon the lever Q at the edge $q$ wherever said lever Q is in any position to arrest the lever P, which, overbalancing the lever O, tends to descend until stopped. On the arms N' and $N^2$ of the standard N are pivoted the latches R' and $R^2$, which are adapted to engage the weighted ends of levers O' and P', respectively, when said levers are elevated, studs $n^2$ $n^2$ being provided on the arms N' and $N^2$ to check the latches within proper limits. These latches have tails $r'$ and $r^2$, which project toward the center, and the lever Q has an arm $Q^2$, from which a stud $Q^{20}$ projects horizontally, so that the tails $r'$ and $r^2$ of the latches project into the path of oscillation with the lever Q. Considering the parts thus far described it will be seen that normally the weight Q' will be at the lowest position resting upon the bottom or otherwise stopped; that the weight O' will be elevated and the weight P' will be down, as seen in dotted line in Fig. 7, and, that the weight O', in rising to elevated position, will have become engaged by the latch R'. If now by any means the weight Q' is lifted, its edge $q$ will pick up the lever P and lift it to a position at which the weight P' will be engaged by the latch $R^2$. This movement of the lever Q will carry the stud $Q^{20}$ against the tail of the latch R' and release it from the weight O' simultaneously with or immediately after the engagement of the latch $R^2$ with the weight P'. The weight O' being not subject to the weight P', because the latter is elevated, will thereupon fall to the lowest position, as seen in full lines in Fig. 7. A lowering of the weight Q' by reverse oscillation of the lever Q will reverse the movements, causing the weight P' to be released from the latch $R^2$ and to descend, lifting the weight O' to latched position, as at the start. It will be seen also that in each of these movements the unlatching and consequent fall of the elevated weight P' or O' occurs only at the limit of the oscillating movement of the lever Q. These parts are thus contrived and related for the purpose of effecting the complete opening and closing of the gas-valve by an instantaneous or quick movement, which may be the result of a gradual change in the conditions, since it is essential in a fuel-gas valve that the change of gas-supply should not be gradual, but instantaneous, the valve being fully open or completely closed, but never subject to a gradual change, because such gradual change prevents the proper mixture of air and gas at the burner and results either in explosion or smoking.

The movements above described of the three levers O, P, and Q are made available by connecting the lever Q, which initiates the change of position, to the bell M' and connecting the lever O with the gas-valve stem. The connection of the bell M' with the lever Q is made by means of a link S, attached to the top of the bell M' at lugs $M^{10}$, provided for that purpose, and connected at the lower end to the arms of the lever S', which is fulcrumed at $s'$ on the upper end of the arm N' of the standard N, said lever S' being connected by the links $S^2$ $S^2$, attached at the ends to said lever at $s^2$, intermediate its fulcrum and its connection with the link S and at the lower ends at $q^3$ to the arm $Q^3$ of the lever Q. The reason for interposing between the bell M' and the lever Q the several parts described instead of connecting directly from the bell to the lever is that since the connections from the lever must be made at a distance from the center a direct connection would tend to tilt the bell and produce friction between it and the chamber-wall, which is very undesirable, whereas the connection employed makes the resistance of the mechanism to the rising and falling of the bell almost perfectly central. There is also a gain of leverage, which is convenient. The connection of the valve-stem to the lever O is made by means of the lever T, fulcrumed at $s'$ on the arm N' of the standard, connected to the valve-stem at $t$ and by means of the link T' to the cross-bar $O^{20}$, which connects the tails $O^2$ of the lever O. The arc of movement of the lever T is so slight that the pivot $t$ of that lever to the valve-stem moves in a line which is so nearly straight and vertical and the length of the valve-stem is so great relatively to that movement that it is not necessary to make any provision other than the spring of the stem for the slight departure from a direct vertical path. The parts are so situated and connected that the bell M', descending far enough to cause all the movements described, is still not quite at the bottom of the chamber. The purpose of this is to be found in the relation of this movement to the vent, which will now be described. Extending from the center of the top of the chamber M is a pipe U, which is a continuation of the duct D, leading from the thermostat and conducting the controlling fluid under pressure to the chamber M. Extending from the upper end of the inverted cup of bell M' and rigidly attached thereto is a rod U', which extends into the pipe U at the lower end, and immediately above the chamber M the pipe U is enlarged, forming the chamber U², at one side of which and integral therewith is formed a chamber U²⁰ for an oscillating valve U³, said valve-chamber being cylindrical and the valve being a disk which is pivoted at the center of its seat and oscillates thereabout in a vertical plane. A port $u^2$ affords communication from the chamber U² to the valve-chamber, and the valve has a stem or finger U³⁰ extending through the port into the chamber U². The valve obtains seat against the diaphragm U⁴, on which it is pivoted, and through said diaphragm-seat is a port $u^4$, and the valve has a corresponding port $u^3$, adapted to register with the port $u^4$ when the valve stem or finger U³⁰ is at one limit of the port $u^2$ and to be completely out of registration when said stem is at the opposite limit of said port. On the rod U' is an abutment U⁵, which serves also as a guide for the rod in the pipe U without obstructing the passage of air or gas through said pipe. The turret or boss $m^{10}$, by which the rod is attached to the top of the cup or bell M', is adapted to enter freely the chamber U² and constitutes another abutment, each of these abutments being adapted to collide with the stem U³⁰ as the rod reciprocates up and down, and these abutments are so located that the collision and consequent shifting of the valve U³ occurs after the movement of the cup or bell has substantially completed the opening and closing, as the case may be, of the main gas-valve, so that, for example, as the bell rises and closes the valve, after the valve is closed the abutment $m^{10}$ collides with the stem U³⁰ and moves the valve U³ to the position shown in Fig. 7, wherein the vent through the ports $u^3$ and $u^4$ is closed, and similarly as the cup or bell descends after having opened the main gas-valve a little farther descent, which the connections with said valve permit, the abutment U⁵ collides with the stem U³⁰ and opens the vent. In the upward movement of the cup or bell the collision of the abutment $m^{10}$ with the stem U³⁰ occurs just as the weight O' is latched up in the position shown in dotted line in Fig. 7, and the collision of the abutment U⁵ in the descent of the bell occurs just after the weight P' has been latched up in the position shown in Fig. 7. The operation of this mechanism may now be fully understood. At the position of the parts shown in Fig. 7 the cup or bell M' has descended until the weight Q' has been raised far enough to cause the weight P' to be latched and the weight O' to be unlatched and to fall and in falling to push up the link T' and lift the lever T, and therewith the valve-stem L' and the valve L, admitting a full supply of gas through the valve-chamber J⁴ and into the pipe J², which leads to the burner. The descent of this cup or bell is caused by the excess of downward pressure over the upward pressure and the resistance, if any, of the mechanism under the bell. This excess may consist merely of the weight of the bell M', the tension of the gas being equaled by the tension of the air or gas admitted within the chamber M above the bell by the action of the thermostat opening the valve E and allowing it to pass through the pipe D and pipe U into the top of said chamber M. The fall of the weight O' when unlatched being practically instantaneous, the resulting lift of the lever P, and consequent opening of the valve L, is likewise practically instantaneous, and the supply of gas is admitted through a wide-open valve, having been the instant before entirely cut off by said valve. Before the heat generated by the burner by the admission of gas thereto can affect the thermostat the bell M' will have completed its descent and opened the vent-port $u^4$. This will cause the pressure within the chamber M above the bell M' to fall below its former tension, and thereupon the gas-pressure under the bell will cause it to rise. Its upward movement, however, will produce no effect upon any of the valves until the abutment M¹⁰ reaches the valve-stem U³⁰. In the meantime the thermostat may have become sufficiently affected by the change of temperature to cause the valve E to move and diminish the access of the compressed air or gas to the duct D and thence to the chamber M; but the bell M' will continue to rise after the valve-stem U³⁰ is reached, as described, and will move the valve U³, diminishing the vent until it does not exceed the access afforded past the valve E. Whenever the tension of the gas or compressed air in the chamber M above the bell is by this means made sufficient, together with the weight of the bell M', to overcome the buoyancy of the gas under the bell, the rising movement of the latter will cease. Should this occur before the bell has risen far enough to cause the weight P' to be unlatched and to fall, and thereby to close the valve L, the gas-supply will continue and the heat be maintained, and should the temperature increase under this continued generation of heat until the thermostat experiencing such increased temperature operates to close the valve E to such extent that it no longer admits gas to the chamber above the bell M' to an extent equal to the vent afforded by the valve U³, the pressure above the bell being thereby diminished, the bell will rise and when near the top will diminish the vent. If the temperature is still increasing and the thermostat is still continuing to close the valve E, corresponding closure of the vent-valve will result from the continued rise of the bell M', caused by the diminution of the supply of pressure-gas which is being cut off by the valve E. The thermostat should be so adjusted that the valve E will be closed before the vent-valve is fully closed. Before the vent-valve is fully closed, however, it will also happen that the weight P' will have been released and will fall, closing the valve L and shutting off the fuel-supply; but the supply-pressure being still experienced under the bell M' it will continue to rise and will close the vent-valve. If now the temperature falls by reason of cutting off the fuel-supply, the valve E will open, and the admission of pressure by that means to the chamber M above the bell M' will cause the bell to descend and at the limit of its descending movement, as described, to first operate the levers under it to cause the opening of the valve L and then to close the vent-valve $U^3$. Thus the thermostat operating to admit pressure by way of the passage controlled by the valve E to the chamber above the bell M' or to cut off such pressure, and the bell M' operating at the end of its movements up or down to close the vent-valve, no change will be made in the position of the supply-valve L, except to fully open or to fully close it, and if such change increases or diminishes the temperature past the desired limit the valve will be again almost immediately reversed—that is, closed if it has been just opened or opened if it has been just closed—and such changes will take place at very short intervals if the conditions are such that very little heat is required to maintain the desired temperature or if very little cessation of heat suffices to reduce the temperature to the desired point.

The thermostat, comprising a closed chamber within which the operating devices are contained, is serviceable when the valve which controls the heat generating or distributing fluid is operated electrically instead of pneumatically, for in the case of electric devices for such purpose the necessity of protecting the contact-points from dust and rust, and for that purpose excluding the exterior air from them, is quite as imperative as the necessity which exists in the pneumatic devices for avoiding resistance in the operation of the valve which controls the pressure fluid. As therefore the pressure-fluid ducts and valve controlling them and all the operating mechanism desirable are inclosed within one chamber with the expanding and contracting element, the latter element being itself fully exposed exterior to the temperature to be regulated and being therefore a part of the wall of the chamber, so in the electrically-operated regulators the electric contact-points and the switch which closes the circuit and all the operating mechanism for said switch are desirably inclosed within a chamber, with the expanding and contracting element as a part of such chamber. Therefore in my claims, wherein I refer to the valve-operating fluid as the "conductor" for such fluid, I do not intend to be understood as limiting myself either to a gaseous fluid or to a tubular conductor.

When fuel-gas is used under a steam-boiler, the customary steam-diaphragm or equivalent device sensitive to the steam-pressure developed in the boiler may be utilized to open a vent from the chamber above the bell M' when the steam-pressure in the boiler reaches any predetermined limit. The pipe W, having the valve W', represents such vent. The lever-arm $W^{10}$ on the valve-stem may be connected in any manner with such steam-diaphragm or equivalent device pertaining to a steam-boiler. The operation of this device, it will be understood, is entirely independent of the operation already described under the influence of the thermostat, its purpose being to cut off the supply of fuel whenever the danger limit in respect to pressure in the boiler is reached without regard to the temperature which may have been produced in the apartment in which the thermostat is located.

It will be obvious that it is a matter of choice whether the devices shown for operating a valve L are arranged to open the valve upon the rising of the bell M' or to close it when the bell rises and open it when the bell falls. If the action were reversed from that herein shown, the pipe W would admit the gas-pressure instead of venting it in order to close the valve when excessive steam-pressure is developed in the boiler.

I claim—

1. In combination with the supply-valve which controls the flow of a heat generating or distributing medium; a fluid-pressure motor which operates said valve; a valve which controls the flow of the pressure fluid to the motor; a thermostat which operates said last-mentioned valve; a vent-valve for the pressure-fluid chamber of the motor, and connections from the moving element of the motor to said valve adapted to operate the latter toward the end of the movements respectively of said element.

2. In combination with the supply-valve which controls the flow of a heat generating or distributing medium; the fluid-pressure motor which operates said valve; a valve which controls the flow of the pressure fluid; a thermostat which operates said last-mentioned valve; a vent-valve for the pressure-fluid chamber of the motor, and connections from the moving element of the motor to the supply-valve and to the vent-valve, adapted to operate the latter after the substantial completion of the operation of the former valve.

3. In combination with the tubular expanding and contracting element A, the rod B extending therein, and regulating mechanism to which it is connected at one end; the sleeve $H^2$; the spring $H^6$, and stops between which said spring reacts located within the sleeve; said sleeve having a stem extending beyond the end of the tube and provided with a graduated head, a threaded connection being provided at a junction between the graduated head and the remote stop.

4. In combination with the tubular expanding and contracting element A, the rod B therein, and the regulating mechanism to which the rod is connected at one end; the sleeve H² longitudinally movable, but non-rotatable, with respect to the tube; the spring H⁶ and stops on the tube and rod respectively between which said spring reacts; and a stem having a threaded connection with the sleeve protruding beyond the tube and provided with a graduated head.

5. In a thermostat, in combination with the vertical tubular expanding and contracting element A, the rod B upheld from one end of the tube; the chamber G attached to the other end of the tube and communicating therewith; the pneumatic tubes leading into said chamber; the valve within said chamber adapted to close the mouth of one of said ducts, and connections from the upheld rod, whereby said valve is operated, all the movements of said connections including the valve, in one change of the expanding and contracting element being against gravity, and all movements in the opposite change being favored by gravity; whereby loose connections at all points are possible without loss of motion.

6. In combination with the tube A and the rod B therein, the chamber G having one head supporting the duct D, the valve E and link K′, and the opposite head supporting the lever K, said lever having an upwardly-open stirrup into which the link K′ is adapted to depend, and suitable means for binding said heads in place.

7. In a temperature-regulator, a thermostat comprising two tubes whose axes are transverse to each other and one of which constitutes the more changeable element of the differential couple of the thermostat, the other tube being adapted to extend into the wall of the room into which the thermostat is located and afford the means for attaching the thermostat, the two elements of the differential couple being connected at the end remote from the last-mentioned tube, one of said elements being attached to, and the other extending into, said tube; a fluid-pressure motor and a duct which connects it with said tube; a valve within said tube which controls the flow of the motive fluid, and mechanism in said tube operated by the element of the differential couple which extends thereinto to operate the valve, the communication between the tubes being closely restricted to prevent the motive fluid from materially influencing the temperature of the tube of the differential couple.

8. In a temperature-regulator having a fluid-operated valve for controlling the flow of the heat generating or distributing medium, in combination with a differential couple, the chamber G to which at one end one member of the couple is attached, and into which the other member extends, said chamber having the conductor for the valve-operating agent leading into it; means for opening and closing the circuit through such conductor; a lever which operates the same located within the chamber and operated by the differential couple; a removable fulcrum for such lever located within and suitably stopped on the wall of such chamber at the end of said chamber near the junction therewith of the expanding and contracting element; and the cap which closes the chamber at that end adapted to fix the removable fulcrum in position.

9. In a temperature-regulator having a fluid-operated valve for controlling the flow of the heat generating or distributing medium; a thermostat comprising a tubular expanding and contracting element, and a rod inclosed therein and connected with one end of said element; a chamber attached to the other end of said element and extended transversely thereto, said chamber having the conductor for the valve-operating fluid leading into it; means in said chamber for opening and closing the circuit through said conductor, and a lever which operates said means; a removable fulcrum for said lever lodged within and stopped upon the wall of said chamber, near the end thereof at which the tubular expanding and contracting element is joined to the chamber; a link which connects the rod within said tubular element to the lever, and a cap which closes the end of the chamber adjacent to said movable fulcrum, adapted in closing the same to secure said movable fulcrum in position.

10. In combination substantially as set forth, the tube A constituting the expanding and contracting element, and the rod B therein connected to one end thereof; the chamber G connected to and extending off at right angles from the other end, said chamber having one head through which the pneumatic ducts enter the chamber, and having at the opposite end another head; the lever K fulcrumed thereon; the rod B being operatively connected to said lever, and a valve to which the lever is operatively connected adapted to close the pneumatic duct.

11. In combination with a valve-body, J′, having inlet and service ports, a valve adapted to seat between said ports to control the flow, the valve-chamber having an outlet independent of said valve, the valve being not adapted at any position to cut off said outlet from the inlet-port, and an expansible gas-receiver connected to said independent outlet; mechanical connections from the valve extending into said receiver, and mechanism therein connected to the valve-stem and operated by the moving element of the expansible receiver to operate the valve, and means for opposing the expansion of the receiver.

12. In combination with a valve, a gas-receiver mounted thereabove and communicating therewith, a valve-stem extending freely into said receiver-chamber through the communicating passage, said passage also communicating freely with the inlet-passage of the valve-body, said receiver consisting of a closed chamber containing liquid and an inverted cup or bell dipping thereinto, the valve-stem being operatively connected with the inverted cup; the connecting passage from the valve-body through which the stem extends being extended upward above the liquid-level into the receiver, and means for introducing fluid-pressure into the closed chamber of the receiver above the inverted cup or bell.

13. In combination with an expansible gas-receiver having a liquid seal, a gas-supply valve having its body connected to the bottom of the receiver, and a suitable extension thereof produced up into the receiver above the liquid-level; the valve-stem extending upward freely through such extension, and the weighted levers fulcrumed within the receiver adapted to operate together in one direction and independently in the opposite direction about their fulcrum; and a third lever also fulcrumed within the receiver adapted to lift one of the weighted levers and operatively connected to the inverted cup or bell of the receiver; latches adapted to engage the weighted levers to hold them in elevated position, said third lever having suitable means for disengaging the latches alternately as it oscillates, and connections from one of said weighted levers to the valve-stem; substantially as and for the purpose set forth.

14. In combination substantially as set forth, the gas-receiver comprising a chamber and an inverted cup or bell therein and adapted to contain a liquid seal, the gas-inlet extending up through the bottom of the chamber under the bell to a point above the liquid, and the gas-valve stem extending within the gas-inlet pipe; the levers O, P and Q having their fulcrums fixed with respect to the receiver, said levers being relatively weighted so that the lever P preponderates over the lever O, the levers O and P being adapted to be engaged by the descending movement of their weighted ends and to be disengaged by the opposite movement, the lever Q being adapted to lift the lever P, said lever Q being operatively connected to the inverted cup or bell of the receiver, and the lever O being operatively connected to the valve-stem, whereby the rise and fall of the inverted cup tends to operate the valve.

15. In combination with the main gas-valve, a gas-receiver communicating with the valve-body at all positions of the valve; the bell or inverted cup adapted to be lifted in said reservoir by the gas-pressure under it, and mechanism connected to the bell and to the valve and adapted at the limits of the movement of the bell to operate the valve.

16. In combination with the main gas-valve, an expansible gas-receiver communicating with the valve-body at all positions of the valve, the moving element of said receiver being adapted to be lifted by gas-pressure under it, and mechanism connected to said moving element and to the valve adapted at the limits of the movement of the former to operate the latter.

17. In combination with an expansible gas-receiver having a communication with the gas-supply, a gas-supply valve controlling such communication and mechanism in the receiver for operating said supply-valve by the movement of the moving element of the receiver, the latter comprising a chamber about said moving element, which has communication with a source of fluid under pressure, and a vent-port; the valve $U^3$ adapted to control the vent-port; and the rod U having abutments to engage and operate the vent-controlling valve toward the limits of the movement of the moving element of the receiver.

18. In combination with an expansible gas-receiver having communication with gas-supply, a valve which controls the gas-supply; mechanism within the receiver for operating said gas-supply valve by moving the moving element of the receiver, the latter comprising a chamber above said moving element which has communication with a source of fluid under pressure; the rod U extending upward from the moving element of the receiver; the oscillating valve $U^3$ having its chamber communicating with the receiving-chamber above said moving element; and the stem $U^{30}$ extending through the port which affords such communication, said chamber of the valve $U^3$ having a vent-port adapted to be opened and closed by said valve; the rod U having abutments adapted to collide with the stem of the valve $U^{30}$ toward the limits of the movements of the moving element of the receiver.

In testimony whereof I have hereunto set my hand, at Chicago, Illinois, this 25th day of July, 1896, in the presence of two witnesses.

THOMAS O. PERRY.

Witnesses:
CHAS. S. BURTON,
JEAN ELLIOTT.